US007099686B2

(12) United States Patent
Ro et al.

(10) Patent No.: US 7,099,686 B2
(45) Date of Patent: Aug. 29, 2006

(54) MICROSTRIP PATCH ANTENNA HAVING HIGH GAIN AND WIDEBAND

(75) Inventors: Haeng-Sook Ro, Seoul (KR); Jae-Seung Yun, Daejon (KR); Soon-Ik Jeon, Daejon (KR); Chang-Joo Kim, Daejon (KR)

(73) Assignee: Electronics and Telecommunications Research Institute, (KR)

( * ) Notice: Subject to any disclaimer, the term of this patent is extended or adjusted under 35 U.S.C. 154(b) by 406 days.

(21) Appl. No.: 10/749,606

(22) Filed: Dec. 30, 2003

(65) Prior Publication Data

US 2005/0054317 A1 Mar. 10, 2005

(30) Foreign Application Priority Data

Sep. 9, 2003 (KR) ...................... 10-2003-0063195

(51) Int. Cl.
*H04M 1/00* (2006.01)
*H04Q 1/38* (2006.01)
*H04Q 19/00* (2006.01)

(52) U.S. Cl. ................ 455/550.1; 455/269; 455/575.1; 343/700 MS; 343/833

(58) Field of Classification Search ............... 455/90.3, 455/269, 347, 550.1, 575.1, 575.5; 343/700 MS, 343/785, 825, 833, 845

See application file for complete search history.

(56) References Cited

U.S. PATENT DOCUMENTS 4,835,538 A 5/1989 McKenna et al.
5,008,681 A * 4/1991 Cavallaro et al. .... 343/700 MS
5,153,600 A 10/1992 Metzler et al.
5,382,959 A * 1/1995 Pett et al. ............ 343/700 MS
5,572,223 A * 11/1996 Phillips et al. .............. 343/833
5,576,718 A * 11/1996 Buralli et al. ........ 343/700 MS
5,977,710 A * 11/1999 Kuramoto et al. ... 343/700 MS
6,421,012 B1 * 7/2002 Heckaman ........... 343/700 MS
6,759,986 B1 * 7/2004 Saliga et al. ......... 343/700 MS

FOREIGN PATENT DOCUMENTS

JP 09-107226 4/1997

OTHER PUBLICATIONS

Lee, R.Q., et al., "Characteristics of a Two-Layer Electromagnetically Coupled Rectangular Patch Antenna, " Electronics Letters, vol. 23, No. 20, pp. 180-181.

(Continued)

*Primary Examiner*—Quochien B. Vuong
(74) *Attorney, Agent, or Firm*—Blakely Sokoloff Taylor & Zafman

(57) ABSTRACT

A microstrip patch antenna having high gain and wide band is disclosed. The microstrip patch antenna includes: a first patch antenna layer for radiating a energy supplied from transmitting/receiving feeding circuit and a first radiation patch electrically coupled to the first dielectric layer and supplying the energy to a receiving feeding circuit electrically coupled with the first radiation patch, wherein the energy is supplied by electromagnetic coupling of a first parasitic patch and second parasitic patch; a second patch antenna layer for improving impedance bandwidth of energy received through the first parasitic patch arranged in between the second dielectric layer and the third dielectric layer and radiating the improved impedance bandwidth; and a third patch antenna layer for improving a gain of the energy received through the second parasitic patch arraigned in between the fourth dielectric layer and the fifth dielectric layer.

9 Claims, 8 Drawing Sheets

OTHER PUBLICATIONS

Revankar, et al., "Broadband Stacked Three-Layer Circular Microstrip Antenna Arrays, " Electronics Letters, vol. 28, No. 21, Oct. 1992, pp. 1995-1997.

Egashira, et al., "Stacked Microstrip Antenna with Wide Bandwidth and High Gain," IEEE Transactions on Antennas and Propagation, vol. 44, No. 11, Nov. 1996, pp. 1533-1534.

Nishiyama, et al., "Stacked Circular Polarized Microstrip Antenna with Wide Band and High Gain," IEEE Antennas and Propagation Society International Symposium 1992 Digest, No. 4, pp. 1923-1926.

* cited by examiner

MICROSTRIP PATCH ANTENNA HAVING HIGH GAIN AND WIDEBAND

FIELD OF THE INVENTION

The present invention relates to a microstrip path antenna having high gain and wideband for satellite broadcasting system and satellite communication system and an array antenna having arranged a plurality of the microstrip patch antennas.

DESCRIPTION OF RELATED ARTS

A microstrip patch antenna has been spotlighted as a mobile planar antenna for receiving satellite broadcasting signal. The microstrip patch antenna has been used in various fields because it can be easily manufactured as a small sized, light weighted, flatted.

However, the microstrip patch antenna also has weak point. It is difficult to manufacture the microstrip patch array antenna to have wideband and high gain characteristic although the microstrip patch array antenna is manufactured by arranging a plurality of microstrip patch antenna each of which having 5% of wideband which is VSWR<2 and 4 to 6 dB gain.

For overcoming the weak point of the microstrip patch array antenna, a microstrip patch array antenna having a stacked-layer structure is introduced. In the microstrip patch array antenna having stacked layer structure, a parasitic patch is stacked in radiation direction on a radiation patch. The microstrip patch array antenna having stacked-layer structure has 7 to 9 dBi gain as unit patch gain and 10 to 15% wideband.

In a prior art, a microstrip patch antenna has been manufactured by stacking and arranging patch elements in signal layer or double layers for obtaining desired gain for reception of satellite broadcasting signal.

However, the above mentioned convention microstrip patch antennas has disadvantages as follows.

A size of the conventional microstrip patch antennas is comparatively large. For arranging and stacking a plurality of antenna elements, complicated feeding circuit is used. Such a complicated feeding circuit causes loss of gain and it leads to cause degradation of antenna efficiency. Therefore, additional antenna elements are used for obtaining desired gain and the size of the microstrip patch antenna becomes increased.

Moreover, in an active phase array antenna, a plurality of active and passive antenna elements is coupled in a back side of antenna and it requires more number of active and passive elements. Thus, a cost of manufacturing the active phase array antenna is increased.

For using the microstrip patch antenna in mobile antenna system for satellite broadcast, the microstrip patch elements must have wideband characteristics, have transmitting/receiving feeding circuit for bidirectional communication, be small sized and have improved gain characteristics.

SUMMARY OF THE INVENTION

It is, therefore, an object of the present invention to provide a microstrip patch antenna having high gain and wideband by using a radiation patch having receiving/transmitting feeding circuit and two parasitic patches for impedance matching and director.

It is another object of the present invention to provide a microstrip patch array antenna having a plurality of a microstrip patch antenna having high gain and wideband by using a radiation patch having receiving/transmitting feeding circuit and two parasitic patches for impedance matching and director.

In accordance with an aspect of the present invention, there is provided a microstrip patch antenna having a high gain and wide band, including: a first patch antenna layer including a ground surface and a first dielectric layer for radiating a energy supplied from transmitting/receiving feeding circuit and a first radiation patch electrically coupled to the first dielectric layer and supplying the energy to a receiving feeding circuit electrically coupled with the first radiation patch, wherein the energy is supplied by electromagnetic coupling of a first parasitic patch and second parasitic patch; a second patch antenna layer including a second dielectric layer and third dielectric layer for improving impedance bandwidth of energy received through the first parasitic patch arranged in between the second dielectric layer and the third dielectric layer and radiating the improved impedance bandwidth; and a third patch antenna layer including a fourth dielectric layer and fifth dielectric layer for improving a gain of the energy received through the second parasitic patch arraigned in between the fourth dielectric layer and the fifth dielectric layer.

In accordance with an aspect of the present invention, there is also provided a microstrip patch array antenna, including: a plurality of microstrip patch antennas being arranged in a serial manner and coupled by electrically coupling transmitting feeding circuits of the microstrip patch antennas to a transmitting port and electrically coupling receiving feeding circuits of the microstrip patch antennas to a receiving port, wherein the microstrip patch antenna includes a first patch antenna layer including a ground surface and a first dielectric layer for radiating a energy supplied from transmitting/receiving feeding circuit and a first radiation patch electrically coupled to the first dielectric layer and supplying the energy to a receiving feeding circuit electrically coupled with the first radiation patch, wherein the energy is supplied by electromagnetic coupling of a first parasitic patch and second parasitic patch; a second patch antenna layer including a second dielectric layer and third dielectric layer for improving impedance bandwidth of energy received through the first parasitic patch arranged in between the second dielectric layer and the third dielectric layer and radiating the improved impedance bandwidth; and a third patch antenna layer including a fourth dielectric layer and fifth dielectric layer for improving a gain of the energy received through the second parasitic patch arraigned in between the fourth dielectric layer and the fifth dielectric layer.

BRIEF DESCRIPTION OF THE DRAWING(S)

The above and other objects and features of the present invention will become apparent from the following description of the preferred embodiments given in conjunction with the accompanying drawings, in which.

Figure 6:
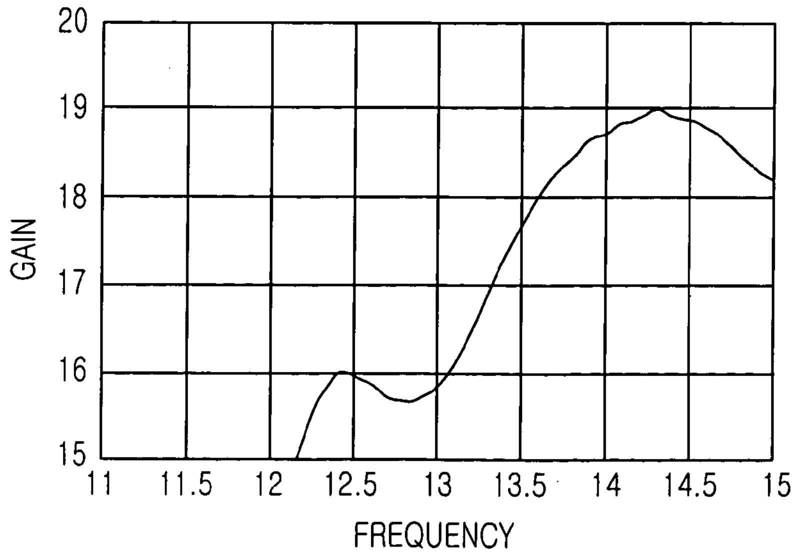
Figure 7:
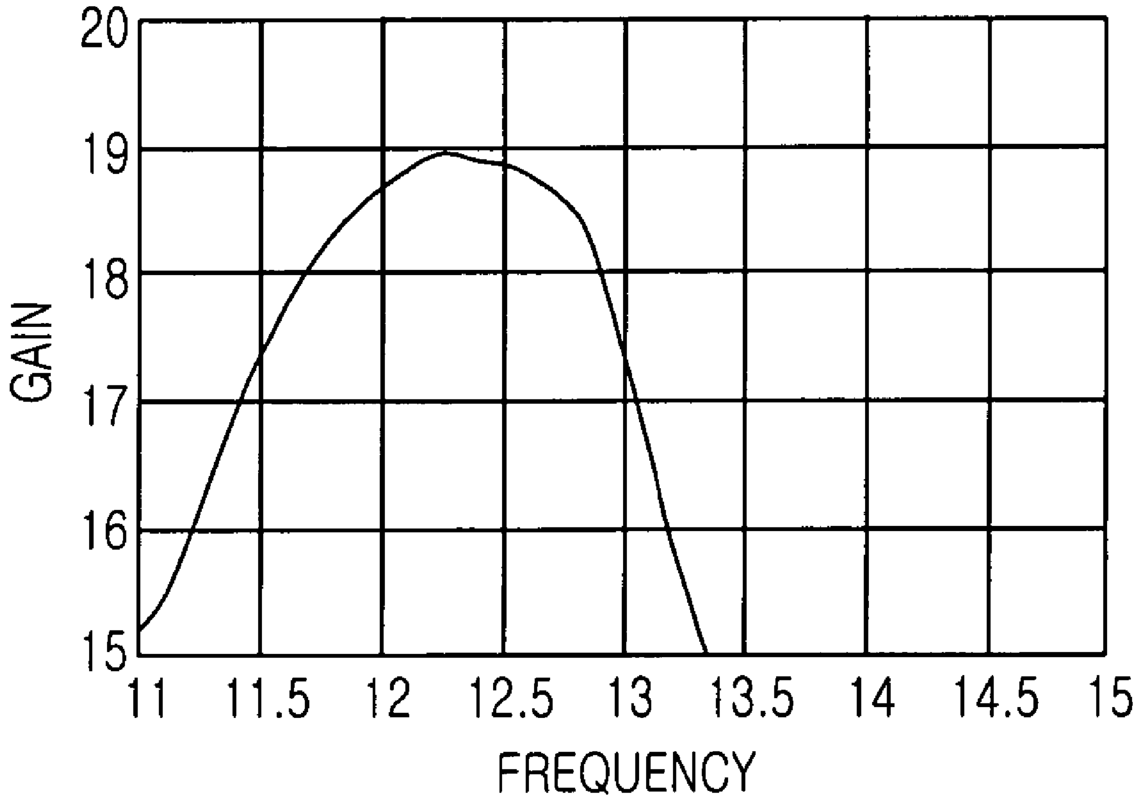

FIG. 6 is a graph showing gain characteristics of the transmitting port a microstrip patch array antenna having high gain and wideband in accordance with a preferred embodiment of the present invention; and FIG. 7 is a graph showing gain characteristics of the receiving ports in a microstrip patch array antenna having high gain and wideband in accordance with a preferred embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
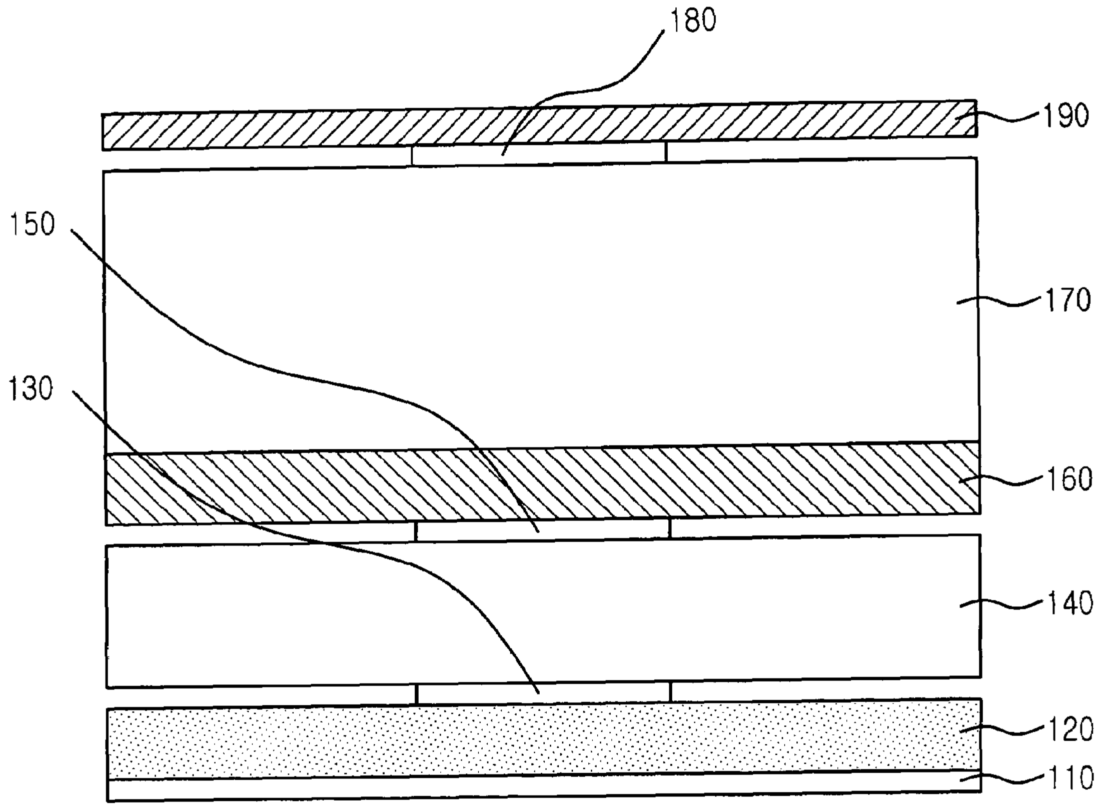
FIG. 1 is a cross-sectional view showing a microstrip patch antenna having a high gain and wideband in accordance with a preferred embodiment of the present invention.
Figure 2:
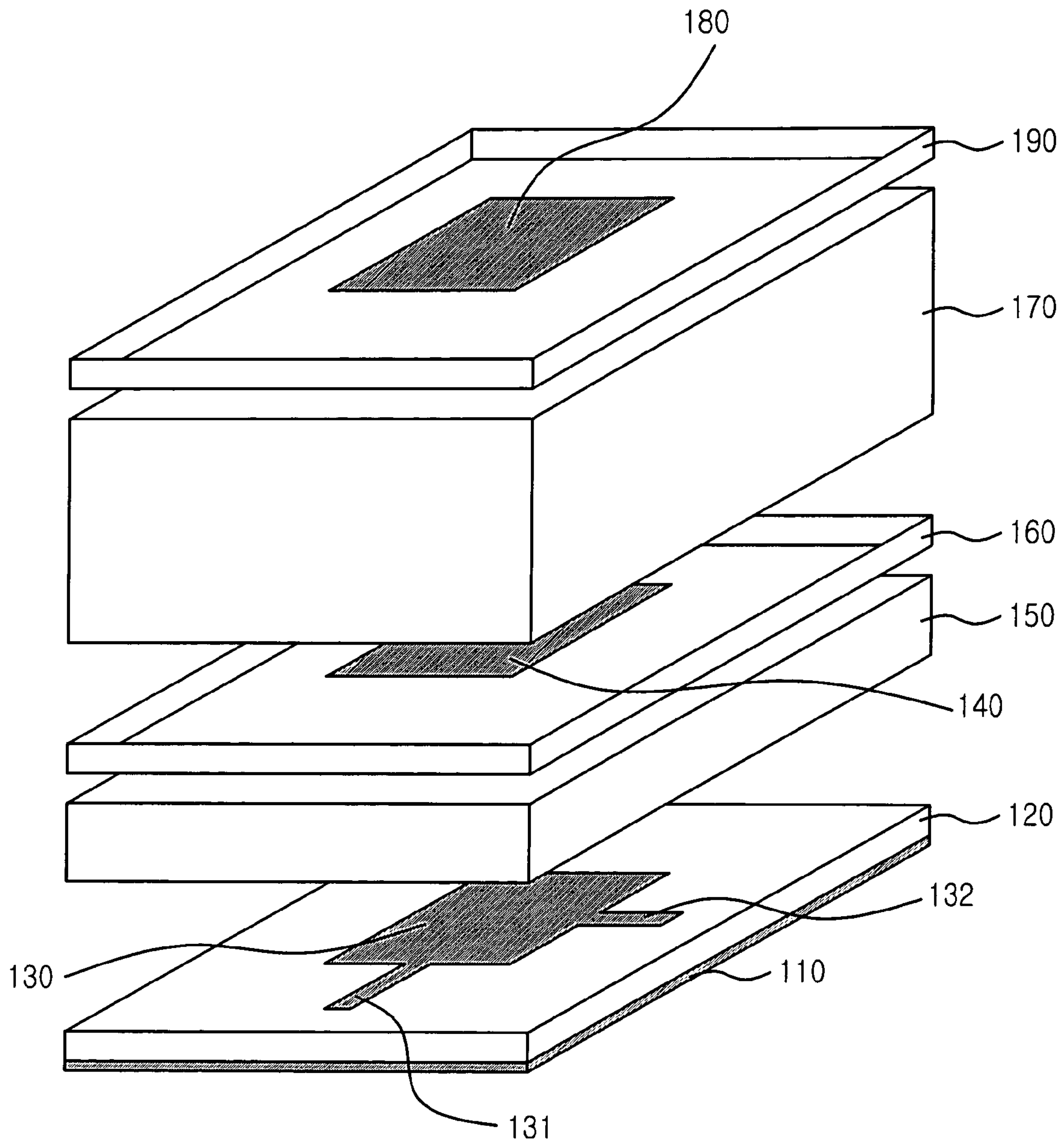
FIG. 2 is a perspective view illustrating the microstrip patch antenna having a high gain and wideband of the present invention.

FIG. 1 is a cross-sectional view showing a microstrip patch antenna having a high gain and wideband in accordance with a preferred embodiment of the present invention and FIG. 2 is a perspective view illustrating the microstrip patch antenna having a high gain and wideband of the present invention.

Referring to FIGS. 1 and 2, the microstrip patch antenna includes a ground surface 110, a first dielectric layer 120, a first radiation patch 130, a first low dielectric layer 140, a first parasitic patch 150, a second dielectric layer 160, a second low dielectric layer 170, a second parasitic patch 180 and a third dielectric layer 190. The first radiation patch 130 is electrically coupled to transmitting feeding circuit 131 and receiving feeding circuits 132 (not shown).

In the above mentioned structure of the microstrip antenna, the first parasitic patch 150 and the second parasitic patch 180 are electrically coupled to the first radiation patch 130 and the electric coupling of the first parasitic patch 150 and the second parasitic patch 180 to the first radiation patch 130 increase a gain and bandwidth. Also, an amount of electrical coupling is varied according to a thickness of dielectric layers 120, 140 and 170_and it also influences to the gain and bandwidth. Therefore, appropriate thickness of the dielectric layer is predetermined for obtaining desired microstrip patch characteristics.

For electromagnetic coupling of the first radiation patch 130, the first parasitic patch 150 and the second parasitic patch 180, they are arranged as an overlapped manner.

Also, the first low dielectric layer 140 and the second low dielectric layer 170 must have lower electric permittivity than the first to third dielectric layers for effective electromagnetic coupling of the first radiation patch 130, the first parasitic patch 150 and the second parasitic patch 180.

The transmitting/receiving feeding circuits 131 and 132 directly and separately feed energy to the first radiation 130 and it is implemented in same layer of the first radiation patch 130 for being simultaneously operated as the transmitting/receiving antenna. Also, the transmitting/receiving feeding circuits 131 and 132 are orthogonally arranged for electrically coupled to the first radiation patch 130.

The third dielectric layer 190 supports the second parasitic patch 180 and, at the same time, works as a radome.

Hereinafter, a microstrip patch antenna having high gain and wideband of the present invention is explained in detail.

The transmitting feeding circuit 131 supplies energy to the first radiation patch 130 and the energy is passed to the first parasitic patch 150 and the second parasitic patch 180. By the first parasitic patch 150 and the second parasitic patch 180, the energy is radiated.

In a mean time, the energy received at the first parasitic patch 150 and the second parasitic patch 180 is passed to the first radiation patch 130 and the first radiation patch 130 passes the energy to the receiving feeding circuit 132.

Figure 3:
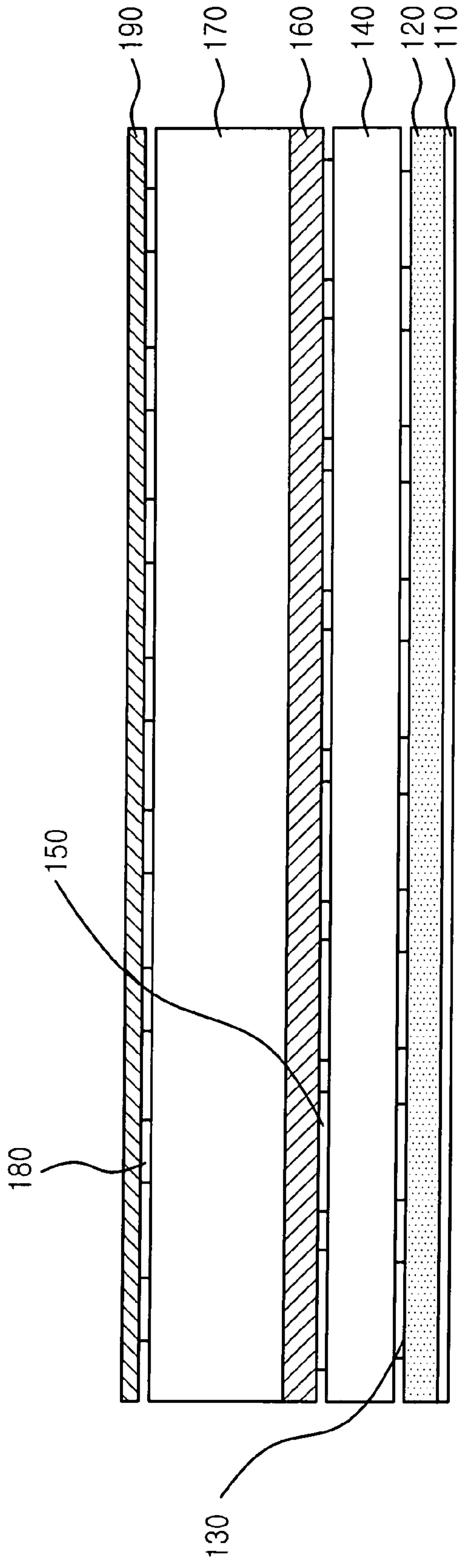
FIG. 3 is a cross sectional view of microstrip patch array antenna having arranged a plurality of microstrip patch antennas in FIG. 1 in accordance with a preferred embodiment of the present invention.

FIG. 3 is a cross sectional view of microstrip patch array antenna having arranged a plurality of microstrip patch antennas in FIG. 1 in accordance with a preferred embodiment of the present invention. The microstrip patch array antenna is formed by arraying 8 microstrip patch antennas in FIG. 1. That is, the micros strip patch array antenna of FIG. 3 is formed by arranging a plurality of the microstrip patch antenna of FIG. 1 in 8×1 unit manner.

Figure 4A:
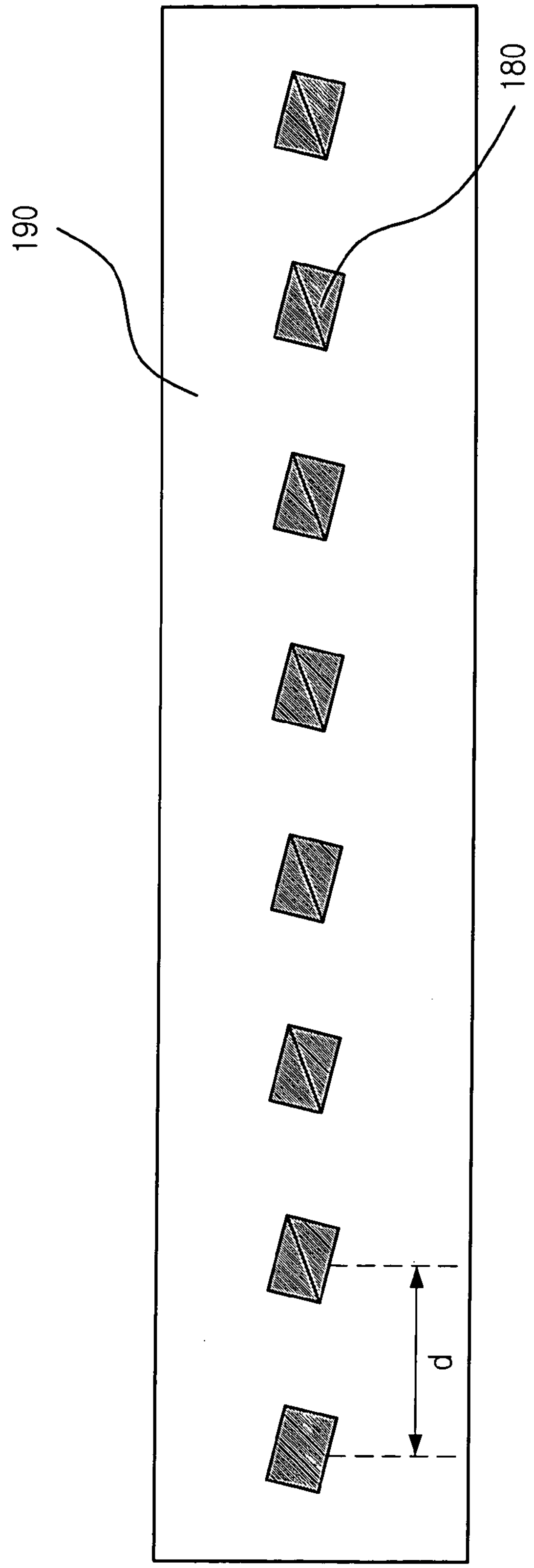
FIG. 4A is a perspective view illustrating a bottom surface of a third dielectric layer of FIG. 3.
Figure 4B:
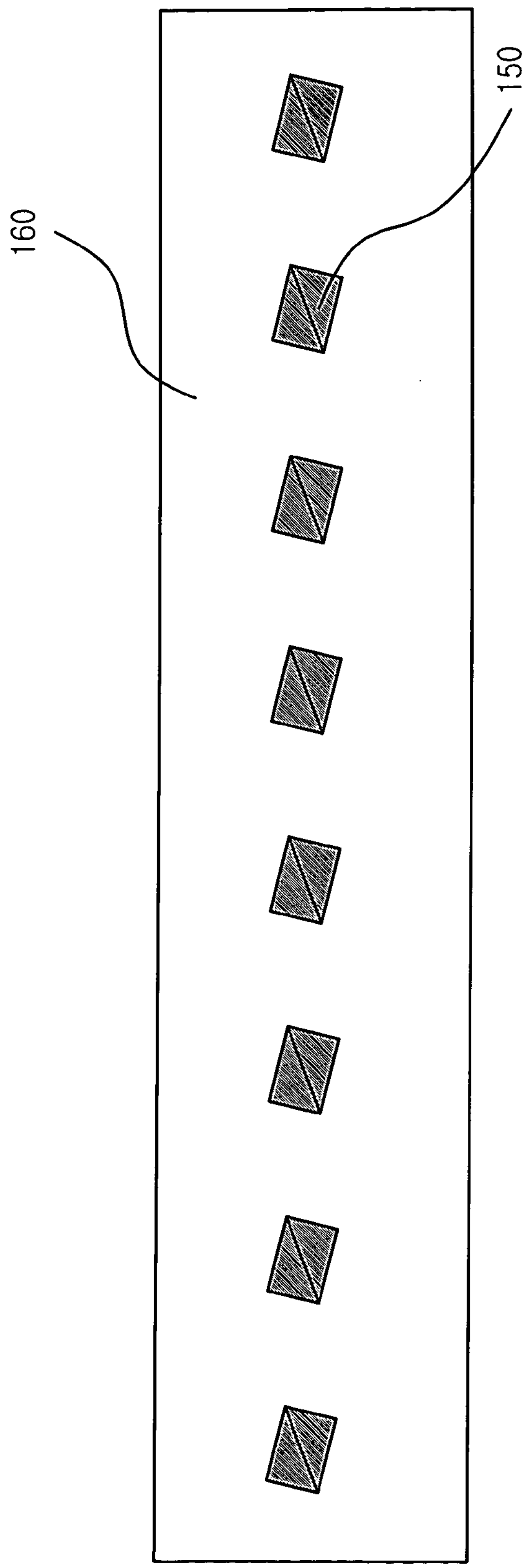
FIG. 4B is a perspective view showing a bottom surface of a second dielectric layer of FIG. 3.
Figure 4C:
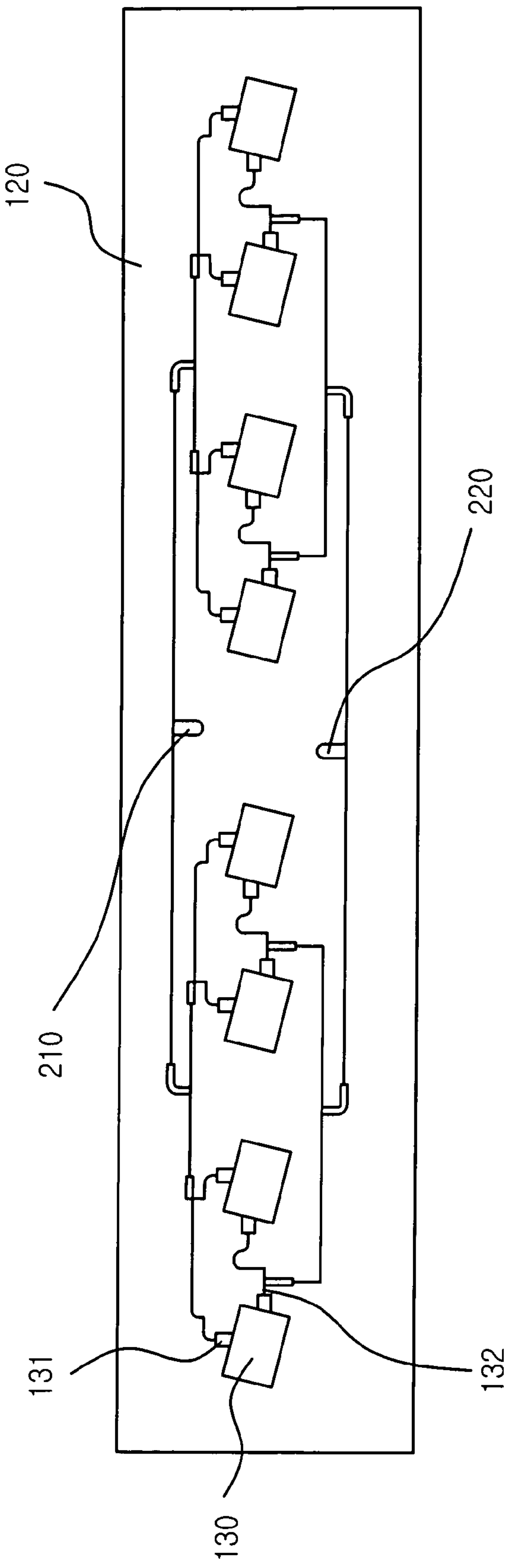
FIG. 4C is a perspective view showing an upper surface of the first dielectric layer.

FIG. 4A is a perspective view illustrating a bottom surface of a third dielectric layer of FIG. 3 and FIG. 4B is a perspective view showing a bottom surface of a second dielectric layer of FIG. 3. FIG. 4C is a perspective view showing an upper surface of the first dielectric layer.

Referring to FIG. 4A, a plurality of second parasitic patches is formed in a predetermined gap "d" on the third dielectric layer 190 and "d" can be predetermined by not decreasing pattern performance or gain between the second parasitic patches in a range of operation frequency. In the preferred embodiment of the present invention, "d" is predetermined between 0.9 λ to 2 λ.

Referring to FIG. 4B, a plurality of the first parasitic patches 150 is formed within a predetermined gap on the second dielectric layer 160.

Referring to FIG. 4C, a plurality of the first radiation patch 130 is formed on the first dielectric layer. Each of first radiation patches 130 includes the transmitting feeding circuit 131 and the receiving feeding circuit 132. Transmitting feeding circuits 131 are electrically coupled to a transmitting port 210 and receiving feeding circuits 132 are also electrically coupled to a receiving port 220.

Also, in the preferred embodiment of the present invention, the transmitting/receiving feeding circuit can implemented by using a predetermined number of coupled electric circuits or serial/parallel distributing circuits for not decreasing pattern performance and minimizing loss in transmitting/receiving bandwidth.

Figure 5:
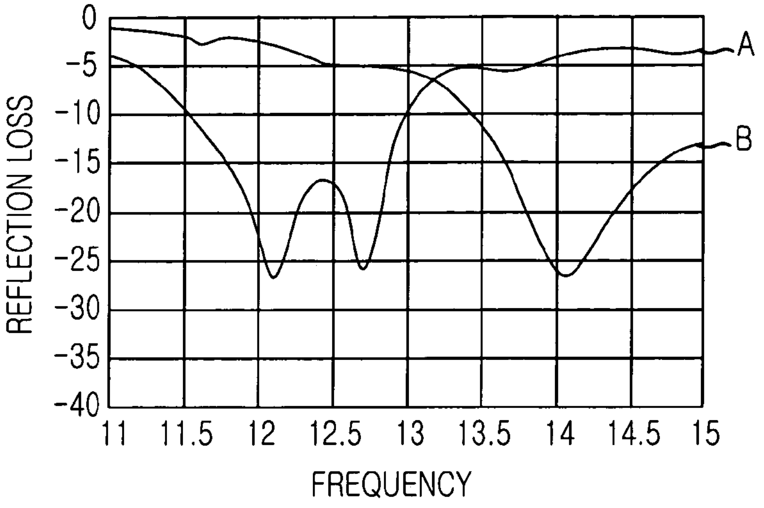
FIG. 5 is a graph showing reflection loss characteristics of a microstrip patch array antenna in accordance with a preferred embodiment of the present invention.

FIG. 5 is a graph showing reflection loss characteristics of a microstrip patch array antenna in accordance with a preferred embodiment of the present invention. A curve "A" represents the reflection loss of a transmitting port 210 of FIG. 4C and a curve "B" represents the reflection loss of a receiving port 220 in FIG. 4C.

Referring to FIG. 5, if a transmitting center frequency is 14.25 GHz and a receiving center frequency 12.25 GHz, an impedance bandwidth of transmitting/receiving ports having less than −10 dB reflection loss is about 10%.

FIG. 6 is a graph showing gain characteristics of the transmitting port in a microstrip patch array antenna having high gain and wideband in accordance with a preferred embodiment of the present invention. The graph shows that the microstrip patch array antenna of the present invention has more than 18 dBi gain and 10% bandwidth.

FIG. 7 is a graph showing gain characteristics of the receiving ports in a microstrip patch array antenna having high gain and wideband in accordance with a preferred embodiment of the present invention. The graph shows that the microstrip patch array antenna of the present invention has more than 18 dBi gain and 10% bandwidth.

As mentioned above, the present invention can simultaneously transmit and receive signal by directly feeding energy to one radiation patch. Also, by using one radiation patch, the microstrip patch array antenna of the present invention can be manufactured as small sized.

Moreover, the present invention can obtain high gain and wide bandwidth by using radiation patch and two parasitic patches which are electrically coupled. Therefore, the number of antenna elements for constructing the microstrip patch array antenna is decreased and the size of array antenna can be reduced.

Furthermore, in case that the present invention is used in an active array antenna, the number of active or passive antenna elements is reduced. Therefore, a cost of manufacturing active array antenna can be reduced.

While the present invention has been described with respect to certain preferred embodiments, it will be apparent to those skilled in the art that various changes and modifications may be made without departing from the scope of the invention as defined in the following claims.

What is claimed is:

1. A microstrip patch antenna having a high gain and wide band, comprising:

a first patch antenna layer including a ground surface and a first dielectric layer for radiating a energy supplied from transmitting/receiving feeding circuit and a first radiation patch electrically coupled to the first dielectric layer and supplying the energy to a receiving feeding circuit electrically coupled with the first radiation patch, wherein the energy is supplied by electromagnetic coupling of a first parasitic patch and second parasitic patch;

a second patch antenna layer including a second dielectric layer and third dielectric layer for improving impedance bandwidth of energy received through the first parasitic patch arranged in between the second dielectric layer and the third dielectric layer and radiating the improved impedance bandwidth; and a third patch antenna layer including a fourth dielectric layer and fifth dielectric layer for improving a gain of the energy received through the second parasitic patch arraigned in between the fourth dielectric layer and the fifth dielectric layer.

2. The high gain wide band microstrip patch antenna for transmitting and receiving as recited in claim 1, wherein the first radiation patch, the first parasitic patch and second parasitic patch are arranged in overlapped manner.

3. The high gain wide band microstrip patch antenna for transmitting and receiving, as recite in claim 1, wherein the second dielectric layer and fourth dielectric layer have an electric permittivity as 1.

4. The high gain wide band microstrip patch antenna for transmitting and receiving, as recited in claim 1, wherein the transmitting feeding circuit and receiving feeding circuit are orthogonally arranged and electrically coupled to the first radiation patch.

5. The high gain wide band microstrip patch antenna for transmitting and receiving, as recited in claim 1, wherein the transmitting feeding circuit and receiving feeding circuit are arranged in the first dielectric layer and directly feeding energy to the first radiation patch separately for receiving and transmitting.

6. The microstrip patch array antenna, comprising:

a plurality of microstrip patch antennas being arranged in a M×N manner and coupled by electrically coupling transmitting feeding circuits of the microstrip patch antennas to a transmitting port and electrically coupling receiving feeding circuits of the microstrip patch antennas to a receiving port, wherein the microstrip patch antenna includes:

a first patch antenna layer including a ground surface and a first dielectric layer for radiating a energy supplied from transmitting/receiving feeding circuit and a first radiation patch electrically coupled to the first dielectric layer and supplying the energy to a receiving feeding circuit electrically coupled with the first radiation patch, wherein the energy is supplied by electromagnetic coupling of a first parasitic patch and second parasitic patch;

a second patch antenna layer including a second dielectric layer and third dielectric layer for improving impedance bandwidth of energy received through the first parasitic patch arranged in between the second dielectric layer and the third dielectric layer and radiating the improved impedance bandwidth; and a third patch antenna layer including a fourth dielectric layer and fifth dielectric layer for improving a gain of the energy received through the second parasitic patch arraigned in between the fourth dielectric layer and the fifth dielectric layer.

7. The microstrip patch array antenna, as recited in claim 6, wherein first radiation patches of the microstrip patch antennas are arranged in a predetermined gap in a range of 0.9λ to 2λ.

8. The microstrip patch array antenna, as recited in claim 6, wherein a plurality of the transmitting feeding circuits and a plurality of the receiving feeding circuits are one of serial/parallel distributing circuit and coupled electric circuit.

9. The microstrip patch array antenna, as recited in claim 6, wherein a plurality of the microstrip patch antennas being arranged in a 8×1 manner and coupled by electrically coupling transmitting feeding circuits of the microstrip patch antennas to a transmitting port and electrically coupling receiving feeding circuits of the microstrip patch antennas to a receiving port.

* * * * *